Aug. 12, 1924.
H. A. SHANER
PLOW ATTACHMENT
Filed Aug. 2, 1922
1,504,982
2 Sheets-Sheet 2
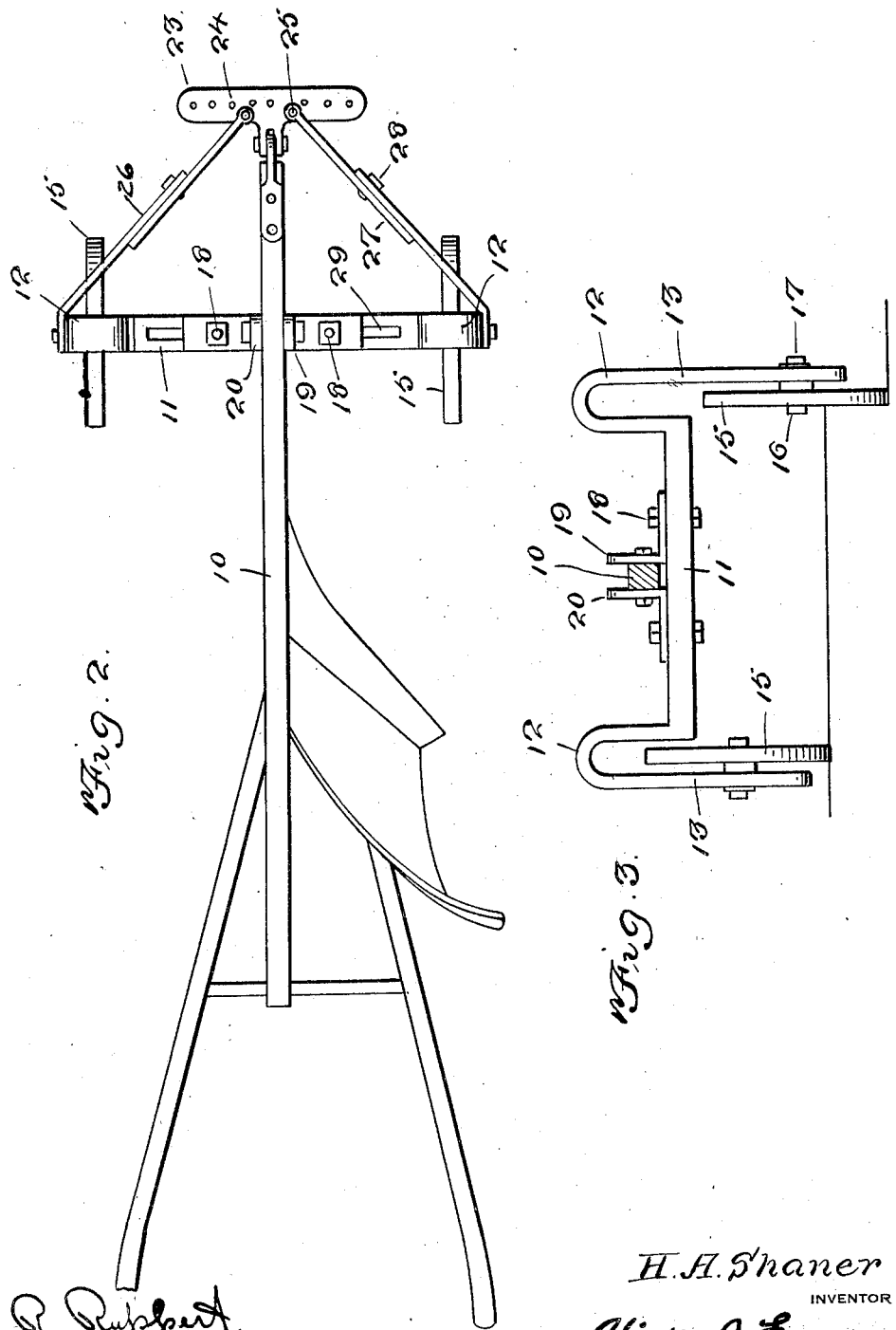

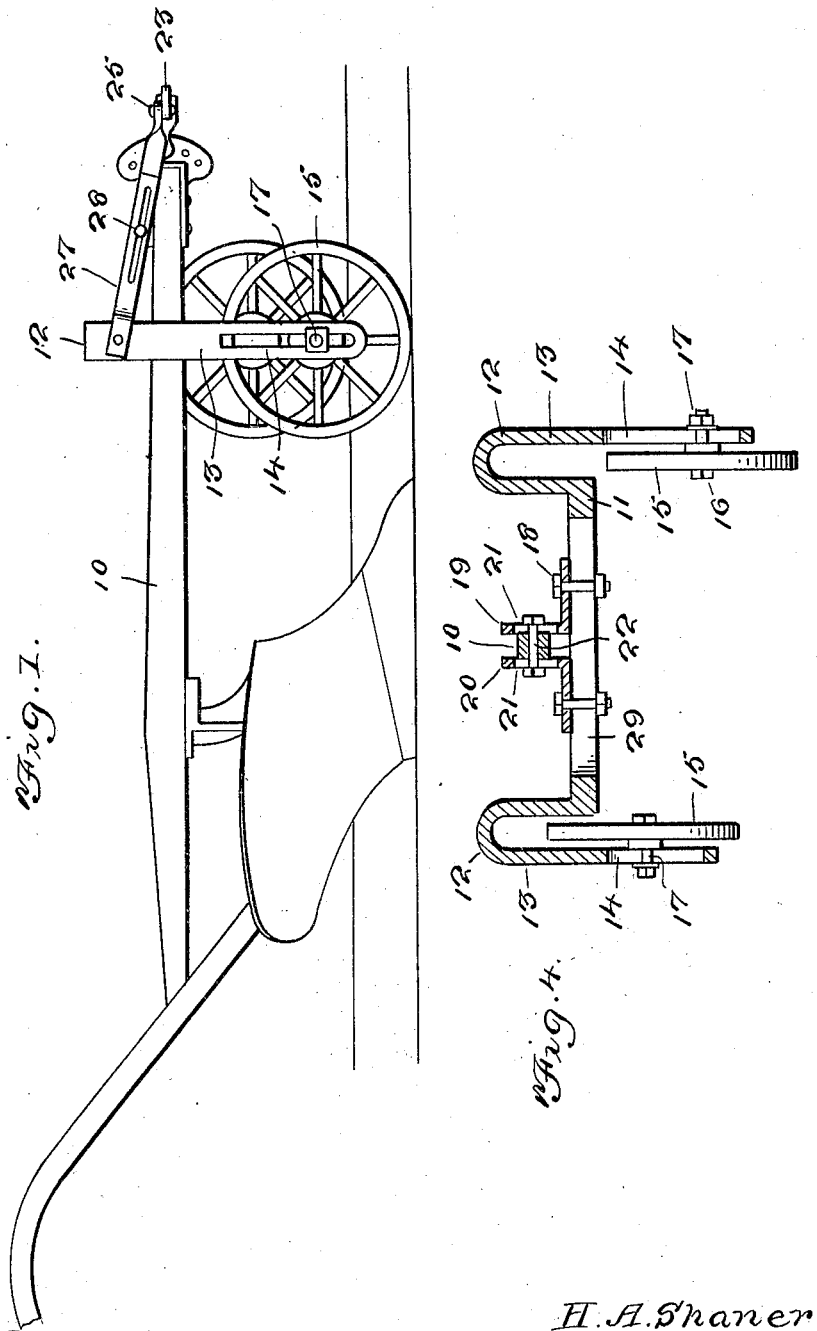

Patented Aug. 12, 1924.

1,504,982

UNITED STATES PATENT OFFICE.

HAROLD A. SHANER, OF MUNCY, PENNSYLVANIA.

PLOW ATTACHMENT.

Application filed August 2, 1922. Serial No. 579,208.

*To all whom it may concern:*

Be it known that I, HAROLD A. SHANER, a citizen of the United States, residing at Muncy, in the county of Lycoming and State of Pennsylvania, have invented new and useful Improvements in Plow Attachments, of which the following is a specification.

This invention relates to agricultural implements particularly to plows, and has for its object the provision of a novel attachment for an ordinary plow whereby the plow can be worked or used for cutting any width of furrow to any desired depth.

An important object is the provision of an attachment of this character which may be applied to an already existing plow without involving any alterations in the construction thereof and which may be easily attached in a short length of time by even an unskilled person.

An additional object is the provision of a device of this character which will be simple and inexpensive in manufacture, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of a plow equipped with my device,

Figure 2 is a plan view thereof,

Figure 3 is a vertical section,

Figure 4 is a cross sectional view taken in advance of the arch member and showing an elevation thereof.

Referring more particularly to the drawings the numeral 10 designates a plow beam of ordinary construction having the usual plow standard and other parts associated therewith. Extending transversely of the plow beam is a cross member 11 formed at its ends with arches 12 having their outer arms 13 formed with slots 14. These arches receive the ground engaging wheels 15 which are mounted upon stub shafts 16 slidably adjustably mounted within the slots 14 and held at desired positions by nuts 17. The position of the wheels governs the depth to which the plow will cut.

Bolted at 18 on the cross member 11 are angle brackets 19 which have their vertical arms 20 formed with slots 21 through which pass bolts 22 which extend through the beam 10 and which carry suitable nuts.

Mounted on the beam 10 is a head 23 formed with a plurality of holes 24 within selected ones of which are engaged securing bolts 25 which pass through the forward ends of rearwardly diverging brace members 26 which are formed as slotted bars 27 adjustably connected by bolts 28.

It should be mentioned that the cross member 11 is formed with a slot 29 through which the bolts 18 pass and which permits adjustment of the cross member laterally with respect to the beam 10.

In the use of the device it will be seen that the various parts may be adjusted and set to the desired position, the depth of the cut being regulated by the vertical position of the ground engaging wheels 15 and the lateral position of the attachment is governed by the width of the furrow.

From the foregoing description and a study of the drawings it will be apparent that I have thus provided a simple and consequently inexpensive plow attachment which may be easily applied and which will efficiently operate to produce accurate work in an obvious and thorough manner. Owing to the simplicity of the construction and the fewness of the parts it is apparent that there is little to get out of order so that the device should have a long life and satisfactorily perform all its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A plow attachment comprising a transverse member formed at its ends with arches, vertically adjustable wheels mounted within said arches, and means for securing the cross member in laterally adjusted position with respect to the plow beam, the arches being of unequal length whereby one wheel may be adjusted to run in a furrow and the other upon the unplowed ground.

2. An attachment for plows, comprising a cross member formed at its ends with arches having their outer arms slotted, wheels journaled within the arches and having their spindles adjustably mounted along said slots, and adjustable braces connected with the cross member and with the beam.

3. An attachment for plows, comprising a cross member formed at its ends with arches having their outer arms slotted, wheels journaled within the arches and having their spindles adjustably mounted along said slots, and adjustable braces connected with the cross member and with the beam, the braces consisting of bars formed with slots and connected by bolts passing through the slots, the bars being connected with the beam and with the cross member.

4. A plow attachment comprising a cross member adjustably mounted upon a plow beam and terminating at its ends in arches of different lengths formed with slots of different lengths, wheels mounted upon spindles adjustably mounted in said slots, angular plates adjustable longitudinally of said cross member and bolted on opposite sides of the plow beam.

In testimony whereof I affix my signature.

HAROLD A. SHANER.